United States Patent [19]

Rowe et al.

[11] Patent Number: 4,461,742
[45] Date of Patent: Jul. 24, 1984

[54] PYROLYSIS OF HYDROCARBONS

[75] Inventors: Frederick Rowe, Middlesbrough; David Brown, Northallerton, both of England

[73] Assignee: Imperial Chemical Industries PLC, London, England

[21] Appl. No.: 362,854

[22] Filed: Mar. 29, 1982

Related U.S. Application Data

[62] Division of Ser. No. 196,562, Oct. 14, 1980, Pat. No. 4,349,432.

[30] Foreign Application Priority Data

Oct. 18, 1979 [GB] United Kingdom ............... 7936152

[51] Int. Cl.³ .......................... B01J 8/14; B01J 12/00; B01F 5/00
[52] U.S. Cl. .................... 422/129; 366/165; 422/149; 422/224
[58] Field of Search ............... 422/129, 149, 150, 158, 422/207, 224; 585/539, 648, 922, 924; 366/165; 208/129, 130; 209/144

[56] References Cited

U.S. PATENT DOCUMENTS

| | | | |
|---|---|---|---|
| 2,616,563 | 11/1952 | Hebb | 209/144 |
| 3,849,075 | 11/1974 | Albright et al. | 422/224 |
| 3,855,339 | 12/1974 | Hosoi | 208/130 |
| 3,959,401 | 5/1976 | Albright et al. | 585/922 X |
| 4,070,250 | 1/1978 | Choi | 209/144 X |
| 4,092,013 | 5/1978 | Staaf | 366/165 |
| 4,224,284 | 9/1980 | Cheng | 422/156 |

FOREIGN PATENT DOCUMENTS 1219051 1/1971 United Kingdom ............... 208/130

Primary Examiner—S. Leon Bashore, Jr.
Assistant Examiner—William R. Johnson
Attorney, Agent, or Firm—Cushman, Darby & Cushman

[57] ABSTRACT

Process and apparatus for pyrolysis of a heavy hydrocarbon feedstock in which the feedstock is countercurrently contacted with a hot hydrogenating gas stream flowing spirally from the periphery of a substantially circular reactor (1). The hydrocarbon feedstock is injected through an inlet (4) located toward the center of reactor (1). The hot hydrogenating gas is preferably formed by combustion, using a steam-oxygen mixture injected through inlet (2), of carbonaceous by-products from the pyrolysis. Product is removed centrally through outlet (3).

4 Claims, 9 Drawing Figures

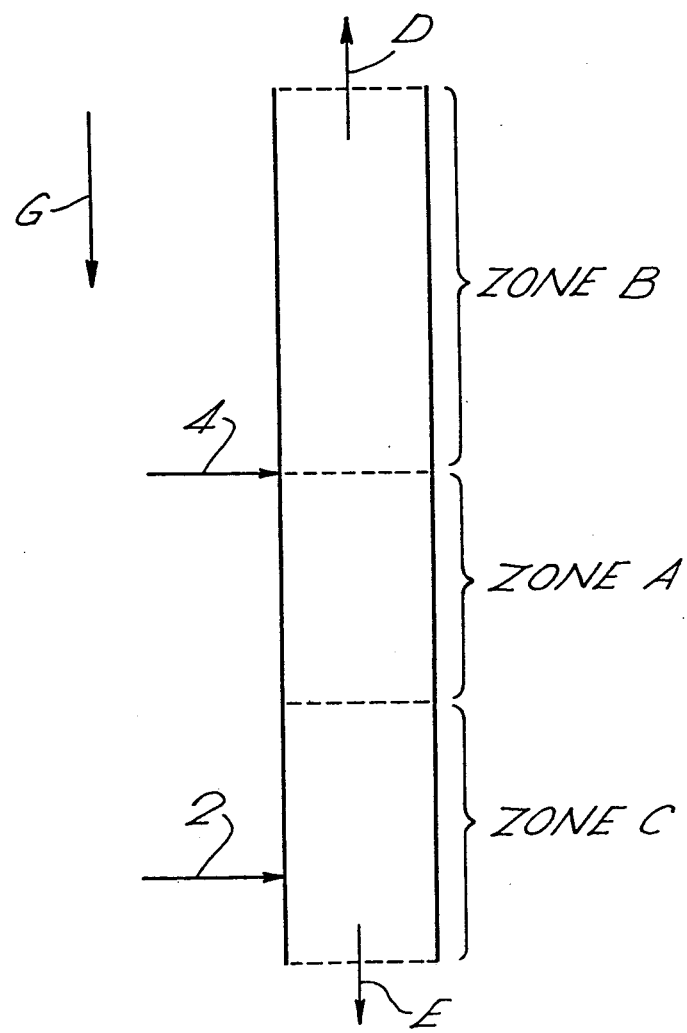

PYROLYSIS OF HYDROCARBONS

This is a division of application Ser. No. 196,562, filed Oct. 14, 1980, now U.S. Pat. No. 4,349,432.

The present invention relates to a process and apparatus for the pyrolysis of hydrocarbon feedstocks, particularly heavy hydrocarbon feedstocks.

Pyrolysis is an established process for the production of chemical intermediates, mainly the lower olefines and single-ring aromatic hydrocarbons, from hydrocarbon feedstocks. It is known that hydrocarbon feedstocks of relatively high molecular weight, for example heavy oils, coal, scrap plastics, produce lower yields of useful chemical intermediates than light feedstocks such as naphtha, LPG and ethane. Also such heavy feedstocks are more difficult to process because they yield significant quantities of tarry and solid materials, of high carbon content, which cause rapid fouling of equipment in addition to posing problems of disposal since they cannot be readily burned. It is also known that yields of useful chemical intermediates can be improved by operating a pyrolysis process at very high temperatures (of the order of 1000° C.) and for very short residence times (in the range of 1 to 100 milliseconds) but in practice the achievement of these conditions has been limited by the tendency of the heavy feedstocks to yield tarry and solid products of high carbon content.

Thus, the heavier hydrocarbon feedstocks are more difficult to pyrolyse under optimum conditions than the lighter feedstocks. It is possible to approach optimum pyrolysis conditions for light feedstocks such as ethane, LPG and light naphtha by passing the feedstock rapidly through externally heated tubes, though the temperatures that can be used in such systems are limited by the metallurigical properties of the tubes used. If heavier feedstocks are used in such system, it is found that the internal surfaces of the tubes rapidly become coated with carbonaceous solids, thereby restricting both the flow of feedstock and heat transfer to the feedstock. Attempts to improve the performance of heavy feedstocks in these systems have included hydrogenation of the feedstock before pyrolysis, to increase the overall hydrogen to carbon ratio and thereby reduce the rate of production of carbonaceous solids; and the admixture of a stream of hydrogenating gas such as hydrogen or synthesis gas with the feedstock as it passes through the pyrolysis tube.

Other proposals for approaching optimum pyrolysis conditions have used alternative means of heating the heavy feedstock so that heat transfer through the furnace tube is not needed. For example, one proposal envisages mixing the feedstock with a rapidly flowing stream of very hot inert solids, the solids being heated in a separate reactor, separating the solids from the pyrolysis product stream and finally recycling the solids to the separate reactor for reheating. Other examples have been based on mixing the feedstock with very high temperature steam (at about 2000° C.) generated externally, or with very high temperature combustion gas produced by burning a fuel in air or oxygen, or a mixture of steam and combustion gases. However, these proposals suffer from the disadvantage that either a very large proportion of hot material must be used to bring the temperature of the feedstock to near the optimum with consequent loss of thermal efficiency or the heat-carrying material must be at a temperature so far above the optimum pyrolysis temperature that initial contact with the feedstock leads to overheating of at least some of the feedstock with consequent loss of desired products. Quenching of such mixtures of pyrolysis products and heat carrier, with subsequent separation of the products, also presents practical difficulties, which detract from the efficiency of the pyrolysis process.

According to the present invention a process for the pryolysis of a hydrocarbon feedstock comprises introducing the feedstock into a reactor and therein flowing the feedstock countercurrently to a stream of hot hydrogenating gas, the hydrogenating gas being obtained, at least in part, by partial combustion of carbonaceous by-products from the pyrolysis process.

The process is of particular use in the pyrolysis of heavy hydrocarbon feedstocks including heavy oils, coal, for example as pulverised coal or crude coal oils, and scrap plastics.

The hot hydrogenating gas is preferably formed by partial combustion in a steam-oxygen mixture of carbonaceous by-products from the pyrolysis reaction. The hot hydrogenating gas provides heat for the pyrolysis reaction and also inhibits secondary polymerisation reactions in the pyrolysis products.

In a preferred form of the present invention, the process comprises injecting a hydrocarbon feedstock at a point towards the centre of substantially circularly-shaped reactor into a stream of hot hydrogenating gas which is flowing spirally in the reactor, the hydrocarbon stream being injected at such a velocity and such an angle that the flow of hydrogenating gas is disturbed as little as possible, for example the angle and velocity of injection of the stream being such that its component of velocity tangential to the radius of the reactor at the poin of entry is approximately equal to that of the spirally flowing hydrogenating gas. The effect of injecting the feedstock into the spirally moving gas stream is to cause the feedstock to be moved countercurrently through the gas stream towards the periphery of the reactor. It is preferred to form the hot hydrogenating gas by injecting a steam-oxygen mixture tangentially and at high velocity at the periphery of the reactor so that the gas mixture travels spirally toward the centre of the reactor and, as it does so, reacts with carbonaceous by-products from the pyrolysis reaction to form the hot hydrogenating gas. If desired, pre-formed hot hydrogenating gas may be injected at the periphery in partial replacement of the steam-oxygen mixture.

The present invention also comprises a reactor for the pyrolysis of a hydrocarbon feedstock and comprising a substantially circularly-shaped hollow enclosed chamber having an orifice which is located substantially centrally in the chamber, a first inlet pipe to the chamber located on the periphery thereof in such a position that a fluid stream passed through the inlet into the chamber will flow substantially tangentially to the inner surface of chamber wall, thereby to create an inwardly-spiralling flow between said first inlet and said orifice, and a second inlet pipe to the chamber located between the centre and the periphery of the chamber, and positioned at such an angle to the wall of the chamber through which it passes that the angle and the velocity at which hydrocarbon reactants enter the chamber through said pipe are such that the flow of fluid from the first inlet pipe is disturbed as little as possible, for example the angle and velocity of injection of hydrocarbon reactants is such that their component of velocity tangential to the radius of the hollow chamber at the point of entry is approximately equal to that of fluid flowing from the first inlet pipe spirally from the periphery of the chamber toward the centre thereof.

Preferably, the reactor is a cylinder or an oblate spheroid and it is further preferred that the reactor should comprise a squat chamber with a width to depth ratio greater than 5:1, more preferably in the range 8:1 to 15:1. Alternatively, the reactor may comprise a section of a cylinder with its upper and lower surfaces defined by shallow cones, apex uppermost.

The substantially-centrally located orifice serves as an outlet for reaction products and it is convenient to connect an outlet pipe to the orifice.

As is usual in the design of hydrocarbon conversion reactors, the apparatus of this invention must be constructed by materials which are resistant to the temperatures used.

Embodiments of the process and apparatus of this invention are hereinafter described in greater detail with reference to the accompanying drawings in which FIG. 1 is a plan view of a reactor according to this invention;

FIG. 9 is a diagrammatic illustration of gas flows and reactions occurring in the reactor of FIGS. 1 and 2.

In the drawings, like numbers have been used for like features of the apparatus.

Figure 1:
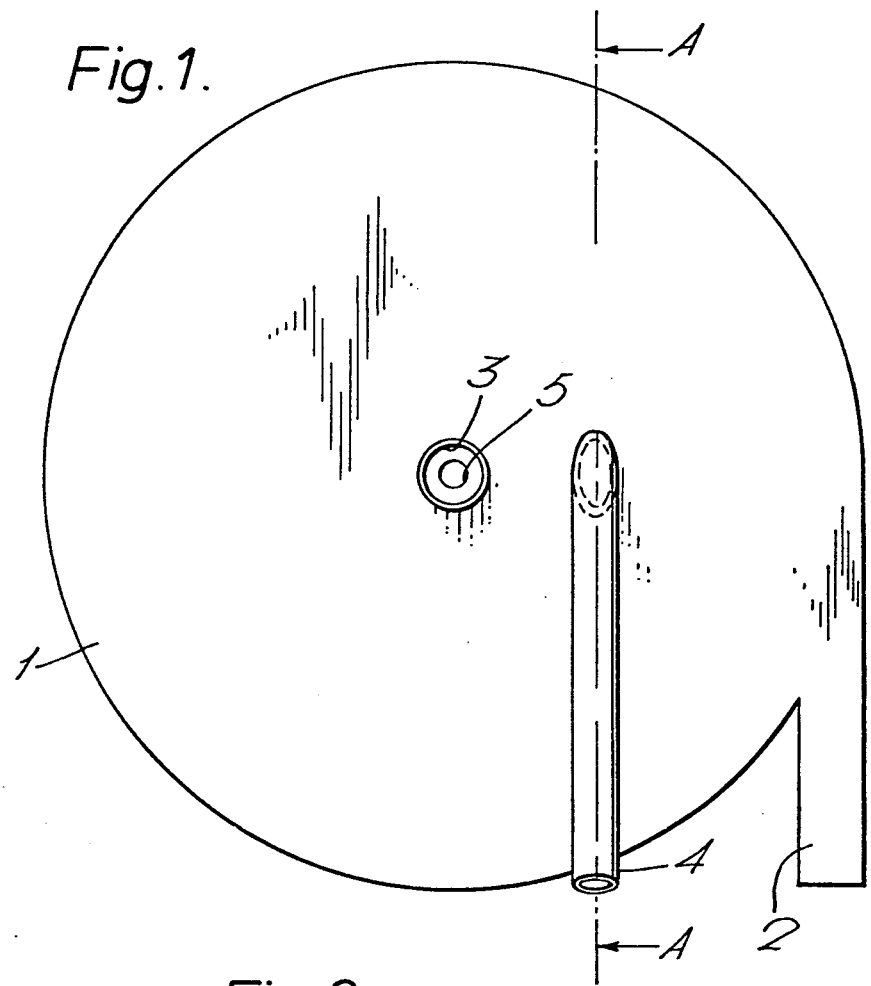
Figure 2:
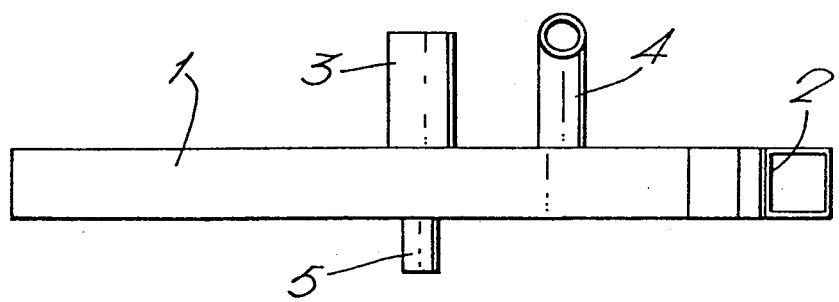
FIG. 2 is an elevational view of the reactor of FIG. 1.
Figure 3:
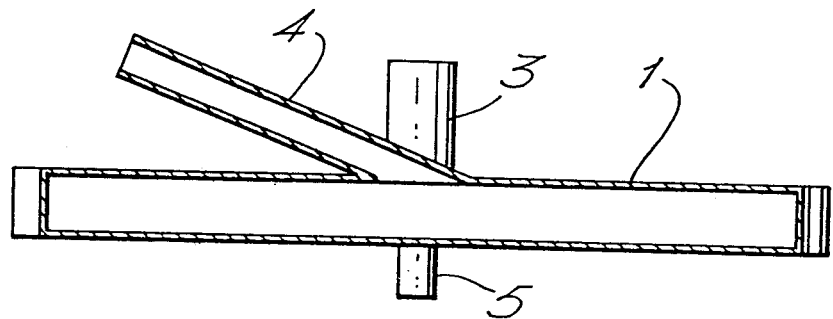
FIG. 3 is a section along line A—A of FIG. 1.

Referring to FIGS. 1 to 3, a squat cylindrical reaction chamber 1 having a width to depth ratio of 12:1 is provided with a tangential inlet pipe 2 at its periphery. A vertically directed exit pipe 3 from the chamber is located in the centre of the upper surface of the chamber. An obliquely-angled pipe 4 is located at a point on the upper surface of the chamber 1 between the centre and the periphery. The factors governing the angle chosen for pipe 4 will be discussed hereinafter in more detail. Optionally, a pipe 5 may be provided, suitably on the same axis as exit pipe 3, to allow entry of quench fluid.

Figure 4:
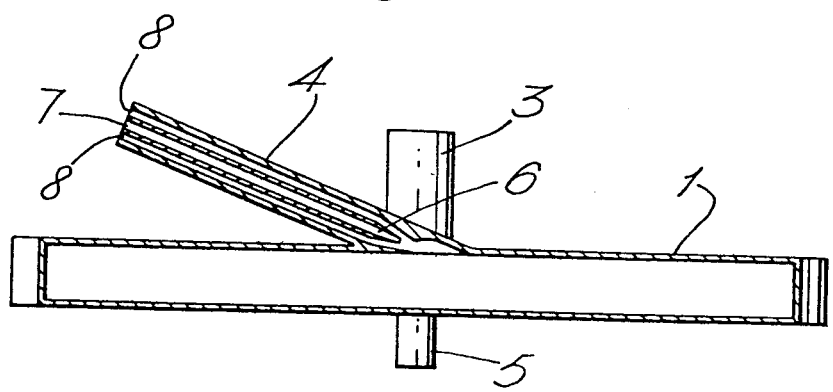
FIG. 4 is a section along line A—A of FIG. 1 modified to illustrate the use of a feedstock atomising jet.

Referring to FIG. 4, distribution of feedstock entering the chamber 1 through pipe 4 may be aided, if desired, by the provision at the exit of pipe 4 of a suitable atomising nozzle 6, thereby providing inner and outer passages, 7 and 8 respectively, within pipe 4.

In use, chamber 1 is supplied at its periphery with a high-velocity tangential stream of pre-heated oxygen and steam through tube 2 from a suitable source (not shown). The cylindrical shape of chamber 1 ensures that the high-velocity stream of oxygen and steam will travel in a spiral path toward the centre of the chamber, thereby exerting a strong centrifugal field within the chamber. Simultaneously, a heavy liquid hydrocarbon feedstock which, optionally, may be pre-heated to a temperature below its decomposition temperature is injected through oblique pipe 4. Optionally, the hydrocarbon feedstock stream may contain a proportion of atomising steam to assist its distribution within chamber 1. If an atomising jet is used in pipe 4 (see FIG. 4) hydrocarbon feedstock is fed along passage 7 and steam along passage 8. The angle at which pipe 4 enters chamber 1 and the velocity at which the feedstock flows down the pipe are so chosen that the component of velocity tangential to the radius of the chamber at the point of entry is approximately equal to that of the gas flowing in a spiral path from the peripheral pipe 2 toward the centre of the chamber. The component of velocity parallel to the axis of the squat cylinder 1 is sufficient to distribute the feedstock over the full depth of the chamber.

The droplets of feedstock thus injected into the strong centrifugal field in chamber 1 travel in a spiral path outwards towards the periphery of the chamber and burn in the oxygen/steam thereby producing a very hot product gas comprising in the main steam, hydrogen and oxides of carbon. As this hot gas travels spirally inwards it encounters countercurrently more of the injected feedstock, thereby heating the feedstock very rapidly to pyrolysis temperature. The more readily pyrolysed components of the feedstock are decomposed into light gases in an endothermic reaction, and are carried away with the inwardly spiralling gas, now cooler as a result of the endothermic reaction. Only the less readily pyrolysed components, including carbonaceous solids are carried outwards by centrifugal force. Thus an equilibrium is rapidly established whereby each droplet of feedstock travels outward by centrifugal force, through an ascending temperature gradient and countercurrent to hot hydrogenating gas which progressively strips away the more readily pyrolysed components leaving only the most refractory components and carbonaceous by-products, if any, to reach the outer regions where they are oxidised by the oxygen-steam mixture injected at the periphery through tube 2 to provide both the heat for the pyrolysis reactions and the hydrogenating gas to carry away the pyrolysis products.

FIG. 9 diagrammatically illustrates the various reactions occurring in chamber 1. The column represents a radial section of chamber 1 with inlet tubes 2 and 4. Arrow G represents the direction of the large centrifugal force. In Zone A, the liquid or solid feed entering by tube 4 undergoes countercurrent pyrolysis by ascending hot gases. In Zone B, pyrolysis or hydropyrolysis of the lighter components from the feedstock occurs. In Zone C, there is gasification of residual carbon to hot carbon oxides and hydrogen. Arrow D indicates product gases going forward for quenching and further treatment. Arrow E indicates the inorganic residues (ash, slag) moving toward the periphery of the chamber.

A very wide range of temperature regimes can be established in the reactor by adjusting the relative proportions of feedstock and steam-oxygen mixture, and/or by adjusting the relative proportions of steam and oxygen in the steam-oxygen mixture and, to a lesser extent, by adjusting the proportion of steam added to the feedstock. Adjustment of the total throughput of materials through chamber 1 enables a wide range of residence times for the pyrolysis reaction to be used. Thus suitable pyrolysis conditions may be established for a wide variety of heavy feedstocks without major mechanical change in the apparatus of the invention.

Product gases, still at high temperature, emerge through exit pipe 3 with a very high angular momentum. The pyrolysis reaction can be quenched in known manner, for example by injection of a cold liquid or by feeding the hot gases to a multitubular heat exchanger raising high pressure steam. The flow pattern of the exit gases is favourable for quenching using a fluidised quench of particulate solids as described in our co-pending UK patent application No. 79/16151.

In FIG. 1, exit pipe 3 is shown as discharging upwards but if desired, for example to make quenching more convenient, exit pipe 3 may discharge downwards. If a cold liquid quench is used, it may be convenient to inject it as a thin, high-velocity stream through pipe 5. The high angular momentum of the product gases would cause rapid dispersion of this quench stream but care would have to be taken to ensure that the velocity of injection of the stream was sufficient to ensure that all the injected liquid passed from pipe 5 to exit pipe 3 and none into chamber 1.

Figure 5:
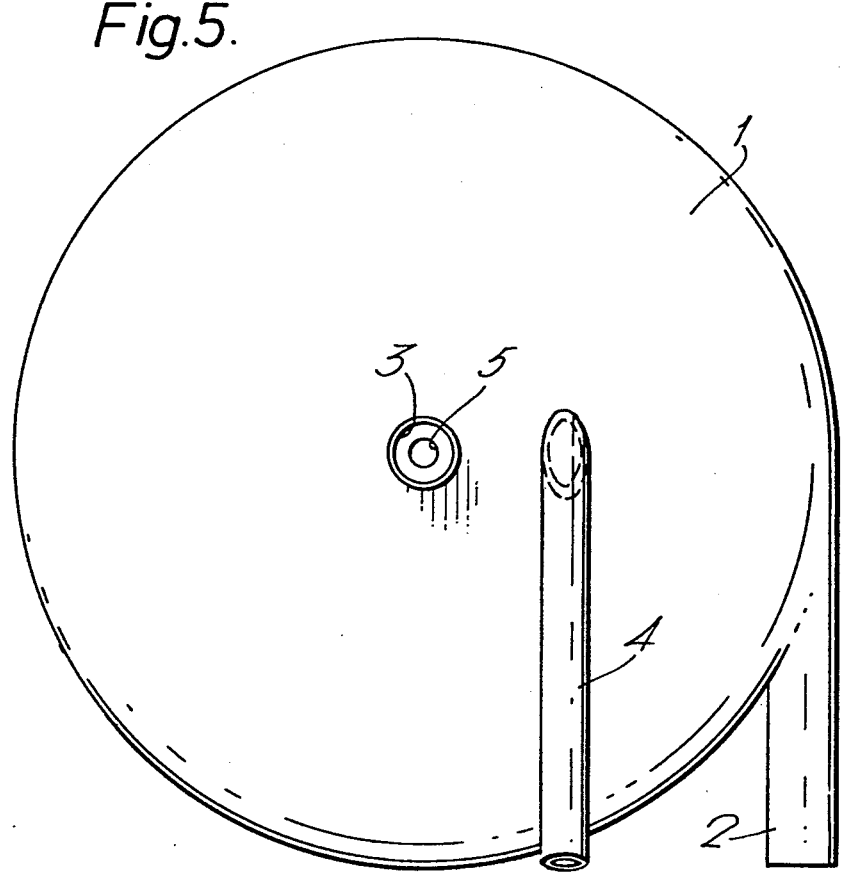
FIG. 5 is a plan view of another reactor according to this invention.
Figure 6:
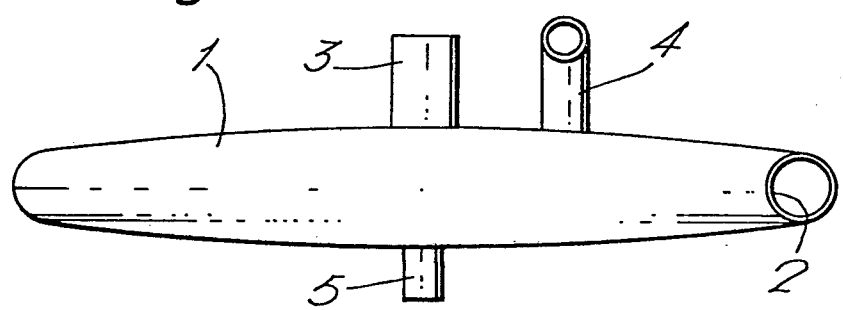
FIG. 6 is an elevational view of the reactor of FIG. 5.

A further embodiment of the apparatus of this invention is illustrated in FIGS. 5 and 6 in which the chamber 1 is in the form of an oblate spheroid. If desired in both this embodiment and that illustrated with reference to FIGS. 1 to 4 single feed pipes 2 and 4 may each be replaced by a plurality of corresponding feed pipes spaced substantially symmetrically around the appropriate radii of the reactor. Feedstock inlet pipe or pipes 4 may feed into the reactor obliquely downwards, as illustrated in FIG. 6, or obliquely upwards, as desired, in both this embodiment and that illustrated with reference to FIGS. 1 to 4.

Figure 7:
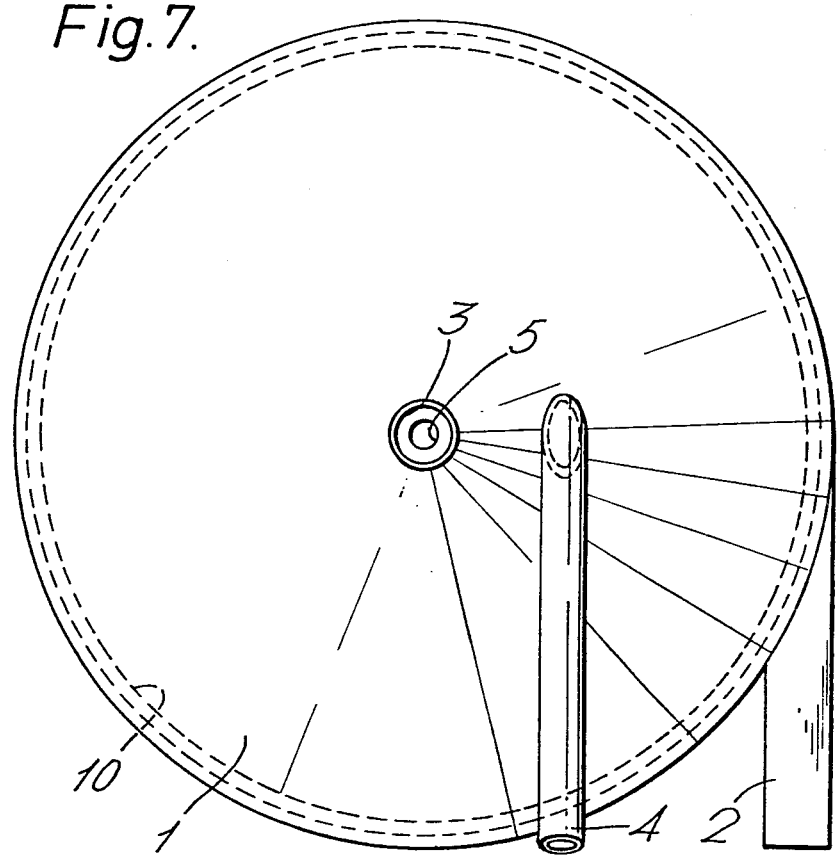
FIG. 7 is a plan view of a third reactor according to this invention.
Figure 8:
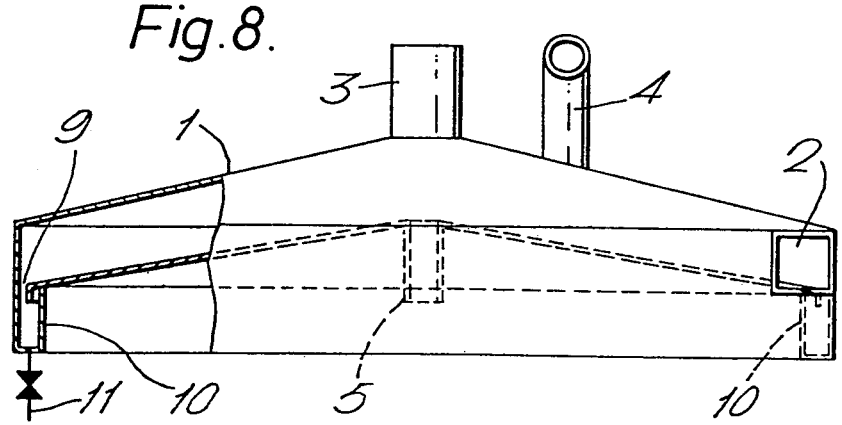
FIG. 8 is an elevational view of the reactor of FIG. 7.

A further embodiment of the apparatus of this invention is illustrated in FIGS. 7 and 8 which show a reactor of particular suitability for dealing with heavy feedstocks with a high inorganic ash content, for example pulverised coal, crude coal liquids, and the distillation residues from some crude oils. When such feedstocks are used, provision must be made for the removal of the inorganic material as slag. The reactor chamber 1 is a section of a cylinder with its upper and lower surfaces defined by shallow cones, apex uppermost. A series of narrow slots 9 is provided at the periphery of the lower cone through which inorganic material, converted to liquid slag under the high temperature conditions existing between the feed inlet 4 and the periphery of the reactor and driven by centrifugal force towards the periphery, may drain into a collecting chamber 10. A line 11 acts as a drain for the liquid slag from the chamber 10.

The process and apparatus of this invention enable pyrolysis of heavy hydrocarbon feedstocks to be readily carried out. As a result of the countercurrent contacting of hydrogenating gas and hydrocarbon feedstock the more readily pyrolysed components of the feedstock are pyrolysed at a lower temperature than the less readily pyrolysed components and also experience a shorter residence time in the reactor. The hot hydrogenating gas serves the dual purpose of providing heat for the pyrolysis reaction and inhibiting secondary polymerisation reactions in the pyrolysis products.

We claim:

1. A cylindrical reaction chamber defined by upper and lower walls and a peripheral wall, said chamber having a relatively high width to depth ratio, a tangentially positioned inlet located in the peripheral wall of said chamber, an outlet from the chamber located in the center of said upper surface wall, an obliquely-angled inlet located at a point in the upper surface wall of the chamber between its center and the peripheral wall, means communicating with said tangentially positioned inlet for supplying a high velocity first fluid stream into said chamber such that the first fluid stream travels in a spiral path around the chamber towards the center of the chamber and exerts a strong centrifugal field therein, means for feeding a further fluid stream into said chamber via said obliquely-angled inlet such that the further fluid stream moves countercurrently through the first fluid stream towards the chamber periphery, the angular disposition of said inlet and the means for feeding said further fluid stream therethrough being such that the component of velocity tangential to the radius of the chamber at the point of entry of said further stream is approximately equal to that of the gas flowing in a spiral path from the tangential inlet toward the centre of the chamber and the component of velocity parallel to the axis of the cylinder being sufficient to distribute the feedstock over the full depth of the chamber.

2. A reaction chamber as claimed in claim 1 which comprises a cylinder or oblate spheroid.

3. A reaction chamber as claimed in claim 1 which comprises a squat chamber with a width to depth ratio greater than 5:1.

4. A reaction chamber as claimed in claim 1 which comprises a section of a cylinder with its upper and lower surfaces defined by shallow cones, apex uppermost.

* * * * *